(12) United States Patent
Karlsson et al.

(10) Patent No.: US 8,321,107 B2
(45) Date of Patent: Nov. 27, 2012

(54) METHOD AND A DEVICE FOR CONTROLLING A DISC CLUTCH

(75) Inventors: Svante Karlsson, Västra Frölunda (SE); Erik Lauri, Mölndal (SE)

(73) Assignee: Volvo Lastvagnar AB, Göteborg (SE)

( * ) Notice: Subject to any disclaimer, the term of this patent is extended or adjusted under 35 U.S.C. 154(b) by 817 days.

(21) Appl. No.: 12/281,335

(22) PCT Filed: Mar. 2, 2006

(86) PCT No.: PCT/SE2006/000276
§ 371 (c)(1),
(2), (4) Date: Jul. 2, 2009

(87) PCT Pub. No.: WO2007/100278
PCT Pub. Date: Sep. 7, 2007

(65) Prior Publication Data
US 2010/0004836 A1      Jan. 7, 2010

(51) Int. Cl.
*G06F 19/00* (2006.01)

(52) U.S. Cl. ............ 701/67; 477/79; 477/180; 477/181; 701/116

(58) Field of Classification Search ............... 701/67–68, 701/51, 116; 477/70, 77, 86, 87, 171, 74–75, 477/172, 36, 79, 179–181, 174; 192/54.1; 74/7 C, 322, 333, 335, 473.19, 473.16, 125.5, 74/732.1, 330, 355
See application file for complete search history.

(56) References Cited

U.S. PATENT DOCUMENTS

| | | | | | |
|---|---|---|---|---|---|
| 3,628,642 | A | * | 12/1971 | Ravenel | 477/81 |
| 4,495,576 | A | * | 1/1985 | Ito | 701/66 |
| 4,552,036 | A | * | 11/1985 | Takano et al. | 477/36 |
| 4,566,348 | A | * | 1/1986 | Akashi et al. | 74/359 |

(Continued)

FOREIGN PATENT DOCUMENTS

DE    19818908 A1    12/1998

(Continued)

OTHER PUBLICATIONS

Modeling and control of a four wheel drive parallel hybrid electric vehicle; Boyali, Ali et al.; Computer Aided Control System Design, 2006 IEEE International Conference on Control Applications, 2006 IEEE Inter. Symp. on Intelligent Control, 2006 IEEE Digital Object Id.: 10.1109/CACSD-CCA-ISIC.2006.4776640, Pub. Yr. 2006 , pp. 155-162.*

(Continued)

*Primary Examiner* — Cuong H Nguyen
(74) *Attorney, Agent, or Firm* — WRB-IP LLP

(57) ABSTRACT

In a method and a control unit for controlling the position of an automatic disc clutch in a vehicle, which disc clutch is arranged to transmit motive force from an internal combustion engine to an input shaft of a stagegeared gearbox in the vehicle, the control unit is arranged to position the clutch in a first position, preparing the vehicle for take off, with the gearbox having a starting gear engaged, and where the clutch in the first position transmits a smaller torque, characterized in that the control unit being further arranged to position the clutch in a second more disengaged position compared to the first position, if a driver of the vehicle does not demand vehicle take off torque by activating a throttle control within a predetermined time.

8 Claims, 5 Drawing Sheets

U.S. PATENT DOCUMENTS

| | | | | |
|---|---|---|---|---|
| 4,594,908 | A | * | 6/1986 | Akashi et al. .................. 74/359 |
| 4,854,433 | A | * | 8/1989 | Tellert .............................. 477/86 |
| 4,858,131 | A | * | 8/1989 | Sugimura et al. ............... 701/68 |
| 5,088,582 | A | * | 2/1992 | Saitou et al. ................... 477/169 |
| 5,172,602 | A | * | 12/1992 | Jurgens et al. .................. 74/335 |
| 5,681,242 | A | * | 10/1997 | Bates ............................ 477/180 |
| 5,871,419 | A | * | 2/1999 | Amendt ........................ 477/180 |
| 5,957,805 | A | | 9/1999 | Salecker et al. |
| 6,001,044 | A | * | 12/1999 | Amendt ........................ 477/180 |
| 6,050,379 | A | * | 4/2000 | Lyon ............................ 192/54.1 |
| 6,347,271 | B1 | * | 2/2002 | Showalter ....................... 701/69 |
| 6,616,577 | B2 | * | 9/2003 | Hayashi ........................ 477/168 |
| 6,711,486 | B1 | * | 3/2004 | Karlsson et al. ................ 701/67 |
| 6,767,311 | B2 | * | 7/2004 | Yoshikawa et al. ........... 477/176 |
| 7,291,094 | B2 | * | 11/2007 | Heier et al. ................... 477/174 |
| 7,300,384 | B2 | * | 11/2007 | Eriksson et al. .............. 477/180 |
| 2005/0170933 | A1 | * | 8/2005 | Eriksson et al. .............. 477/180 |
| 2005/0283298 | A1 | * | 12/2005 | Ochi et al. ....................... 701/67 |
| 2010/0004836 | A1 | * | 1/2010 | Karlsson et al. ................ 701/67 |

FOREIGN PATENT DOCUMENTS

| | | | |
|---|---|---|---|
| DE | 19822547 C1 | | 12/1999 |
| DE | 102 50 734 | * | 10/2002 |
| EP | 0628443 A2 | | 12/1994 |
| SE | 0202137-6 | * | 7/2002 |
| WO | PCT/SE03/00929 | * | 6/2003 |
| WO | 2004005744 A1 | | 1/2004 |
| WO | PCT/EP03/10895 | * | 5/2004 |
| WO | WO 2007100278 A1 | * | 9/2007 |

OTHER PUBLICATIONS

Second-order sliding modes control for in-vehicle pedal robots; Alt, B.; Svaricek, F.; Variable Structure Systems (VSS), 2010 11th International Workshop on; Digital Object Identifier: 10.1109/VSS.2010.5544545; Publication Year: 2010 , pp. 516-521.*

Intelligent Design of Automobile Fixtures with Genetic Algorithms; Tung-Kuan Liu et al.; Innovative Computing, Information and Control, 2007. ICICIC '07. Second International Conference on; Digital Object Identifier: 10.1109/ICICIC.2007.359 Publication Year: 2007 , pp. 326.*

Study of ironless permanent magnet devices being both a coupling and an axial bearing for naval propulsion; Charpentier, J.F.; Fadli, N.; Jennane, J.; Magnetics, IEEE Transactions on; vol. 39 , Issue: 5 , Part: 2 ; Digital Object Identifier: 10.1109/TMAG.2003.816732; Publication Year: 2003 , pp. 3235-3237.*

Autonomous decentralized control for formation of multiple mobile robots considering ability of robot; Takahashi, H.; Nishi, H.; Ohnishi, K.; Industrial Electronics, IEEE Transactions on; vol. 51 , Issue: 6; Digital Object Identifier: 10.1109/TIE.2004.837848 Publication Year: 2004 , pp. 1272-1279.*

Precise position tracking control based on adaptive neuron PID algorithm for automatic clutch driven by DC motor; Xudong Wang; Xianping Xie; Xiaogang Wu; Tengwei Yu; Vehicle Power and Propulsion Conference, 2008. VPPC '08. IEEE; Digital Object Identifier: 10.1109/VPPC.2008.4677409; Publication Year: 2008 , pp. 1-4.*

Adaptive Nonlinear Observer for Electropneumatic Clutch Actuator With Position Sensor; Langjord, H.; Kaasa, G.-O.; Johansen, T. A.; Control Systems Technology, IEEE Transactions on; vol. 20 , Issue: 4; Digital Object Identifier: 10.1109/TCST.2011.2151283; Publication Year: 2012 , pp. 1033-1040.*

A new gearbox generation for vertical roller mills; Raeber, R.; Weller, U.; Amato, R.; Cement Industry Technical Conference, 2006. Conference Record. IEEE; Digital Object Identifier: 10.1109/CITCON.2006.1635719; Publication Year: 2006.*

A Variable Speed Magnetic Gear Box Using Contra-Rotating Input Shafts; Shah, L.; Cruden, A.; Williams, B.W. Magnetics, IEEE Transactions on; vol. 47 , Issue: 2 , Part: 2 ; Digital Object Identifier: 10.1109/TMAG.2010.2097273 Publication Year: 2011 , pp. 431-438.*

Torsional Vibration Effects on Induction Machine Current and Torque Signatures in Gearbox-Based Electromechanical System Kia, S.H.; Henao, H.; Capolino, G.-A.;Industrial Electronics, IEEE Transactions on; vol. 56 , Issue: 11 Digital Object Identifier: 10.1109/TIE.2009.2026772; Publication Year: 2009 , pp. 4689-4699.*

A New Scheme for a Mechanical Load Position Control Driven by a Permanent Magnet DC Motor and a Nonzero Backlash Gearbox; Mokhtari, H.; Barati, F.; Industrial Electronics, 2006 IEEE International Symposium on; vol. 3 Digital Object Identifier: 10.1109/ISIE.2006.295889; Publication Year: 2006 , pp. 2052-2057.*

International Search Report for corresponding International Application PCT/SE2006/000276.

Suppmentary European Search Report for corresponding European App. EP 06 71 6963.

* cited by examiner (Prior art)

METHOD AND A DEVICE FOR CONTROLLING A DISC CLUTCH

BACKGROUND AND SUMMARY

The present invention relates to a method of controlling an automatic disc clutch, the disc clutch being arranged in a motor vehicle in order to transmit motive force from an internal combustion engine to a gearbox.

The invention also relates to a control unit for controlling an automatic disc clutch.

The invention also relates to a computer program for carrying out said method.

Automatic Mechanical Transmissions (AMT:s) have become ever more common in heavier vehicles with the increasing development of microprocessor systems, making it possible, with a control computer and a number of control devices, such as servomotors, for example, to precisely regulate the engine speed, engagement and disengagement of an automatic disc clutch between engine and gearbox, and gearbox clutch members in relation to one another, so that smooth gear changes are always achieved at the correct engine speed. The advantage with this type of automatic gearbox compared to a conventional automatic gearbox made up of planetary gear trains and having a hydrodynamic torque converter on the inlet side lies partly in the fact that it is simpler and more robust and can be manufactured at substantially lower cost than the conventional automatic gearbox, especially where used in heavy vehicles, and partly in that it affords greater efficiency, which means scope for reduced fuel consumption.

A gearbox of the AMT-type usually comprises an input shaft, an intermediate shaft, which has at least one toothed gear meshing with a toothed gear on the input shaft, and main shaft with toothed gears, which mesh with toothed gears on the intermediate shaft. The main shaft is then further connected to an output shaft coupled to the driving wheels via a prop shaft, for example. Each pair of toothed gears has a different gear ratio from another pair of gears in the gearbox. Different transmission ratios are obtained in that different pairs of gears transmit the torque from the engine to the driving wheels.

The development of computer technology has also had an impact on electronic control and feedback systems for a vehicle engine, and these systems have become more precise, faster and more adaptable to prevailing engine and environmental conditions. The entire combustion process can be precisely controlled according to any operating situation. The vehicle's throttle lever (an accelerator pedal, for example), which primarily controls the fuel supply to the engine, controls the vehicle's engine via electrical wiring and electronic signals. The throttle lever is therefore equipped with sensors for detecting the throttle lever position, that is to say what throttle opening is required.

In the process of starting or maneuvering the vehicle an automatic disc clutch as described above is included in the AMT and is usually controlled by means of information on the position of the throttle lever, the rotational speed of the engine, the engine output torque, the position of the disc clutch and from a reference position of the disc clutch, which is selected on the basis of when the disc clutch just begins to transmit torque (traction position), this position being relatively easy to define. A torque typically transmitted in the reference position may be in the order of 30 Nm. The engine output torque is mostly calculated from the quantity of fuel injected into the engine. In the starting sequence and maneuvering the vehicle is typically started from stationary or a virtually stationary state, and the engine commences the sequence at idling speed. The position of the disc clutch and hence the degree of engagement, which determines the torque transmitted from the engine to the gearbox, primarily depends on where the driver positions the throttle lever. The reference position of the disc clutch is used to give the driver of the vehicle more accurate control of the vehicle take off in that the disc clutch assumes the reference position immediately a starting gear is selected and engaged. The vehicle is prepared for immediate take off. Thus in many situations the driver experiences only a small flat spot, if any, when the accelerator pedal is depressed. The driver therefore obtains a theoretically direct response and the vehicle in principle starts to move as soon as the accelerator pedal starts to be depressed.

FIG. 1$a$ shows the fundamental correlation between the position of the accelerator pedal and the torque transmitted to the input shaft of the gearbox according to the prior art. When the accelerator pedal is fully released and a starting gear is selected the disc clutch assumes the reference position and a certain torque is therefore transmitted to the input shaft of the gearbox. The more the driver depresses the accelerator pedal the more torque is transmitted to the gearbox and an acceleration of the vehicle is obtained. FIG. 1$b$ correspondingly shows basically how, according to the prior art, the position of the disc clutch depends on the position of the accelerator pedal. With the accelerator pedal released the reference position (POSRF) is assumed, and from the reference position the disengagement diminishes the more the accelerator pedal is depressed, which gives the increasing torque transmission according to FIG. 1$a$. The maximum position in FIG. 1$b$ denotes the clutch in the fully engaged position.

WO2004/005744 shows an arrangement where a clutch control system may also select a more disengaged position at zero throttle opening, if the control system does not receive signals indicating that the driver intends to start (vehicle take off) the vehicle, for example if the control system detects that the driver is keeping the vehicle brake pedal depressed.

According to prior art when a starting gear has been engaged and the clutch is positioned in said reference position, the vehicle is ready to response immediately when the driver of the vehicle depresses the accelerator pedal. If the driver does not depress the accelerator pedal and does not touch the brake pedal the clutch just continues to be positioned in said reference position, and, thus, a small torque is being transmitted to the gearbox even if the vehicle is standing still. This means that fuel is consumed for purely warming up and wearing down the clutch.

There is therefore a need, in a vehicle equipped with an automatic disc clutch, to decrease friction losses and clutch wear.

The method according to the invention describes a method for controlling the position of an automatic disc clutch, in which method the primary function of the disc clutch is to transmit motive force from an internal combustion engine arranged in a vehicle to an input shaft of a stagegeared gearbox arranged in the vehicle. The method is employed when the gearbox has a starting gear engaged and the clutch is positioned in a first position (PosRF), which prepares the vehicle for take off, and where in said first position the clutch transmits a smaller torque. The method is characterized in that if a driver of the vehicle does not demand vehicle take off torque by activating a throttle control within a predetermined time, said clutch will be positioned in a second more disengaged position (POS2) compared to said first position.

The advantage of the method according to the invention is that fuel will be saved and wear of the clutch will be decreased. The same advantages are achieved with an aspect of the invention relating to a device.

According to an advantageous second embodiment of the method according to the invention said clutch is positioned in said second position when sensing depression of the brake pedal if a brake pedal in the vehicle is depressed before said predetermined time has passed. The advantage of this is that even more fuel can be saved and wear of the clutch can be decreased. The driver indicates that there will not be any vehicle take off when the driver depresses the brake pedal, and thus, the vehicle does not need to be prepared for immediate vehicle take off.

BRIEF DESCRIPTION OF THE DRAWINGS

The present invention will be described in more detail below with reference to the drawings attached, which by way of example show further preferred embodiments of the invention and the prior art.

DETAILED DESCRIPTION

Figure 1A:
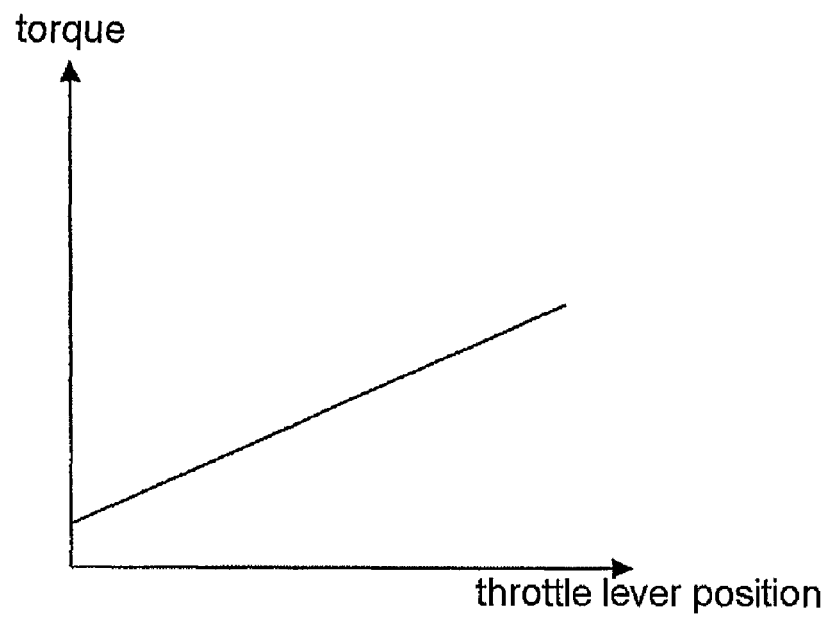
FIGS. 1a and 1b show the fundamental correlation between transmitted torque and throttle lever position, and between clutch position and accelerator pedal position according to the prior art.
Figure 1B:
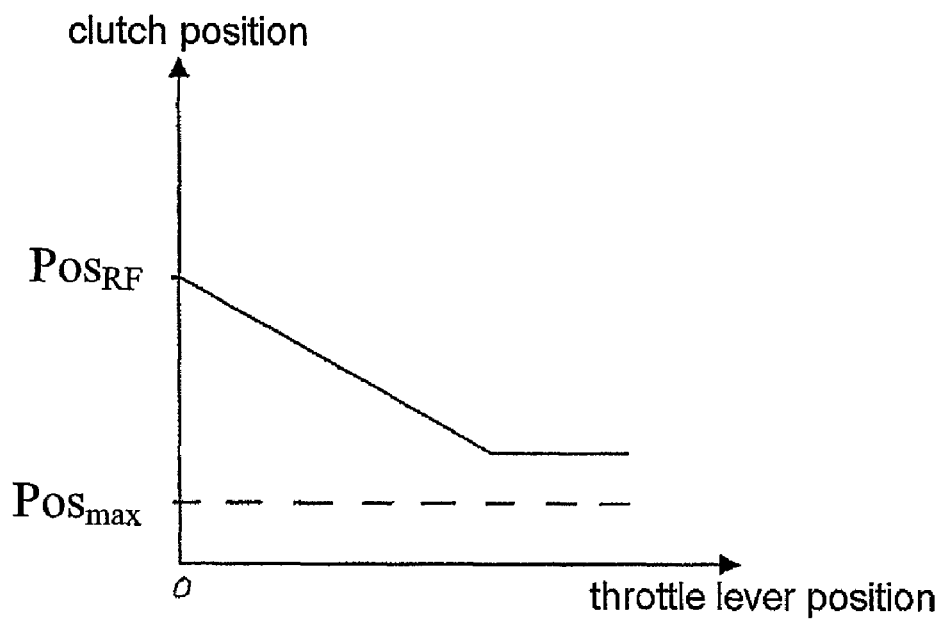
Figure 2:
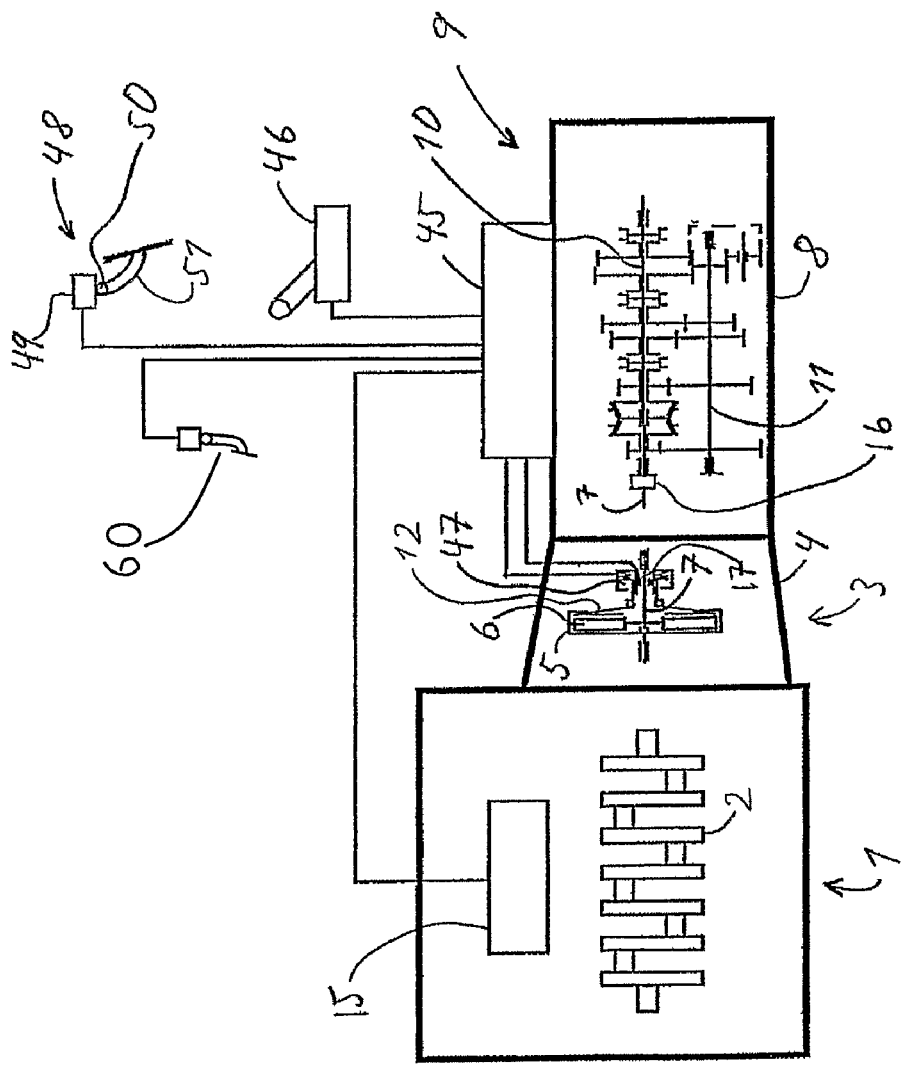
FIG. 2 shows a schematic diagram of an embodiment of a device for controlling an automatic disc clutch according to the invention, the disc clutch being arranged between an engine and an automatic stagegeared gearbox.

In FIG. 2, 1 denotes a six-cylinder internal combustion engine, for example a Diesel engine, the crankshaft 2 of which is coupled to a single-disc dry clutch generally denoted by 3, which is enclosed in a clutch cover 4. Depending on the magnitude of the maximum torque to be transmitted by the clutch, the clutch may have more than one disc and pressure plate 12. The crankshaft 2 is rotationally fixed to the clutch housing 5 of the clutch 3, while the disc 6 thereof is rotationally fixed to an input shaft 7, which is rotatably supported in a gearbox housing 8 of a gearbox generally denoted by 9. A main shaft 10 and an intermediate shaft 11 are also rotatably supported in the housing 8.

Servo devices (not shown) in the gearbox, which engage and disengage the different gears in the gearbox 9, are controlled by an electronic control unit 45 as a function of control unit input signals representing various engine and vehicle data. Among other things, the control unit 45 comprises a microcomputer with memory units. In the embodiment shown the throttle lever 48 is an accelerator pedal, but it may also feasibly be some form of manually controlled throttle, for example a throttle on the steering wheel. The position of the throttle lever is obtained from an angle sensor 49, which is coordinated with the pedal arm 51 of the throttle lever 48 pivotally mounted on a shaft 50. When the gear selector 46 is in the manual shift position gear shifting is performed at the driver's, command via the gear selector 46. The control unit 45, via an engine control unit 15, may also control the fuel injection, that is to say the engine torque or engine speed, as a function of the throttle lever position and the air admission to a pneumatic piston-cylinder device 47, which controls the clutch 3. The position of the automatic clutch 3 is obtained by a position sensor 17.

The degree of engagement of the disc clutch 3 may be divided into several different levels or positions. The traction position is the position of the clutch 3 when it is transmitting just sufficient motive force from the engine 1 to the gearbox 9 that the vehicle can just start to move forwards from stationary. A known method of identifying the traction position is shown, for example, in SE 9903117-1. A typical value for the traction position is a clutch position which transmits approximately 30 Nm.

The embodiment according to FIG. 2 is further equipped with a service brake system for retarding the vehicle in a known manner. The service brake system comprises a brake control unit (not shown) for controlling brake actuators (not shown) and a brake pedal 60 for generating input signals to said brake control unit and also said control unit 45, thus providing the brake control unit and the control unit 45 with information about driver retarding demands.

Figure 3:
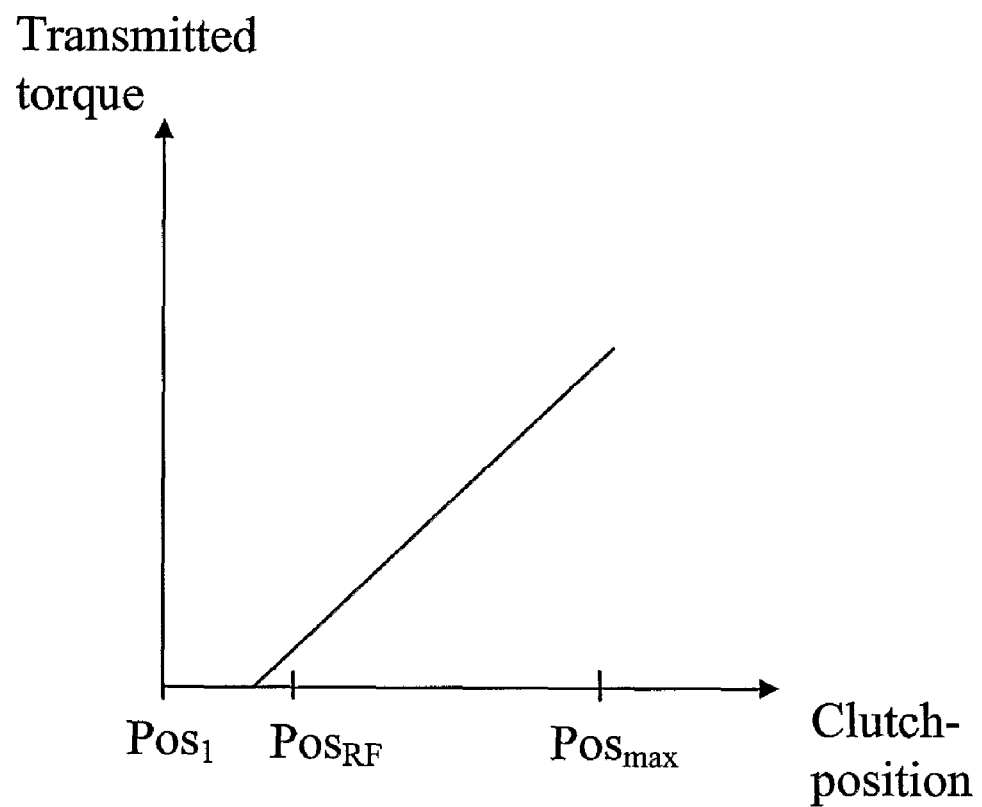
FIG. 3 shows the fundamental correlation between transmitted torque and clutch position according to one embodiment of the invention.

At the initiation of a starting sequence, for example the selection and engagement of a starting gear either by the driver or by the automatic control system and released brake pedal 60, the control unit 45 immediately controls the clutch from a disengaged position to a traction position to make the vehicle ready for take off. When the clutch is positioned in said traction position and the vehicle is standing still or close to standing still, this can be defined as the starting mode of the vehicle. In FIG. 3 the disengaged position is depicted Pos1 and the traction position, henceforth defined as the reference position, is depicted PosRF. The clutch 3 is fully engaged at Posmax and, thus/, maximum torque is transmitted from the engine 1 to the gearbox 9.

Note that the positioning of the clutch to the reference position PosRF can be initiated when one of the following conditions occur;
 the driver or the automatic control system selects and engages a starting gear;
 a starting gear is already engaged and the driver fully releases the brake pedal;
 a starting gear is already engaged and the driver fully releases the accelerator pedal when the vehicle is at stand still or almost stand still.

Figure 5:
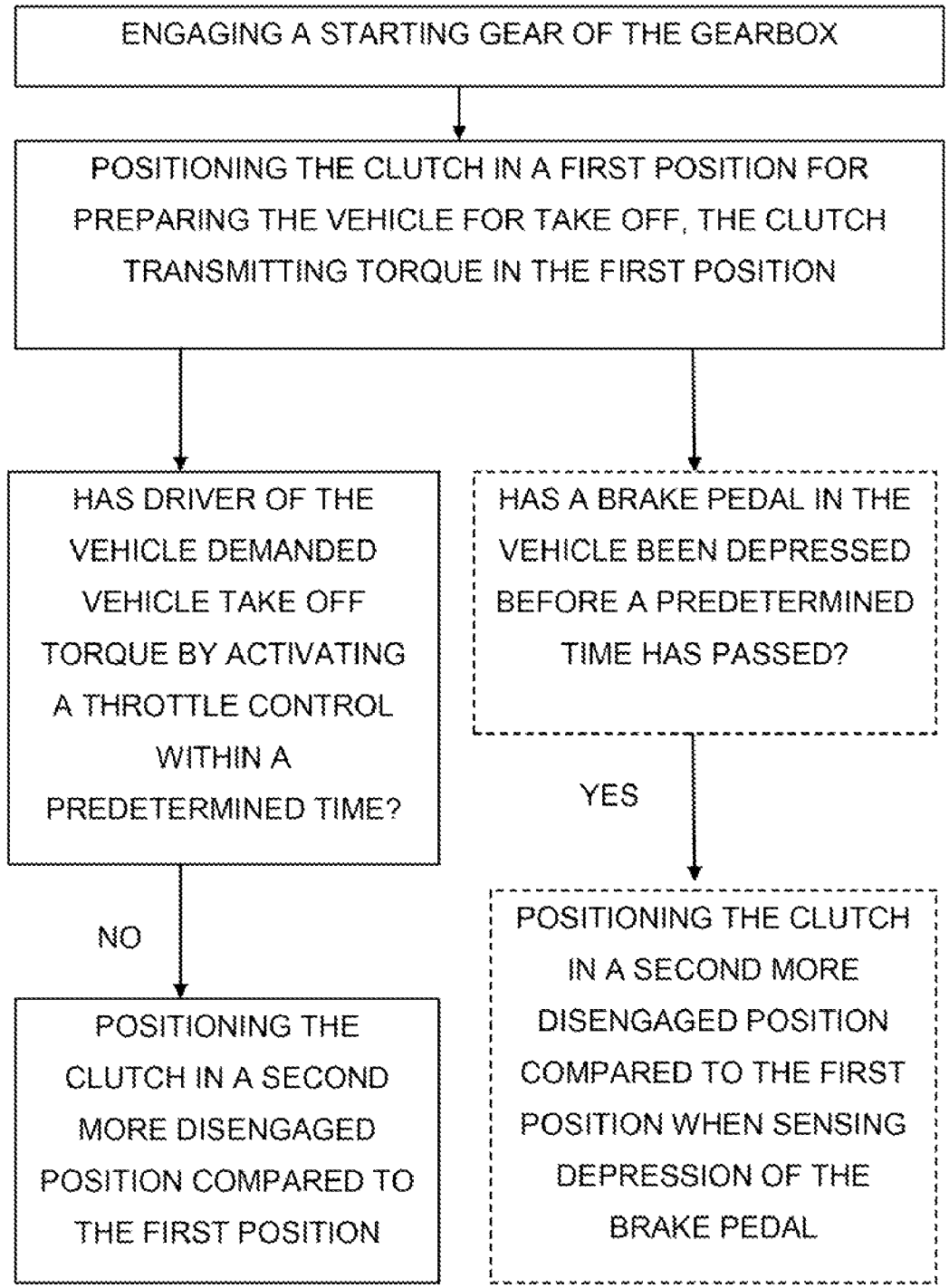
FIG. 5 is a flow chart illustrating a method according to an aspect of the present invention.

According to one first embodiment of the invention, the control unit 45 is programmed to start a time counter (not shown) when the clutch 3 is positioned in said reference position PosRF. When the time counter has reached a predetermined value, e.g. 5 seconds, and the driver of the vehicle has not during this time touched the throttle lever 48, the control unit 45 is programmed to position the clutch 3 back to the disengaged position Pos1. In one embodiment of the invention the control unit 45 is programmed to immediately move the clutch 3 from PosRF to the disengaged Pos1 if the brake pedal 60 is depressed. A method according to the foregoing is illustrated by a flowchart shown in FIG. 5. Preferably also the brake pedal 60 can be provided with an angle sensor for sensing and sending a signal to the control unit 45 if the brake pedal 60 has been depressed. Another possibility is that the control unit 45 uses a brake light signal, that is sent in a known manner from the brake control unit to brake lights (not shown) arranged on the vehicle, to register if the brake pedal 60 has been depressed.

Figure 4:
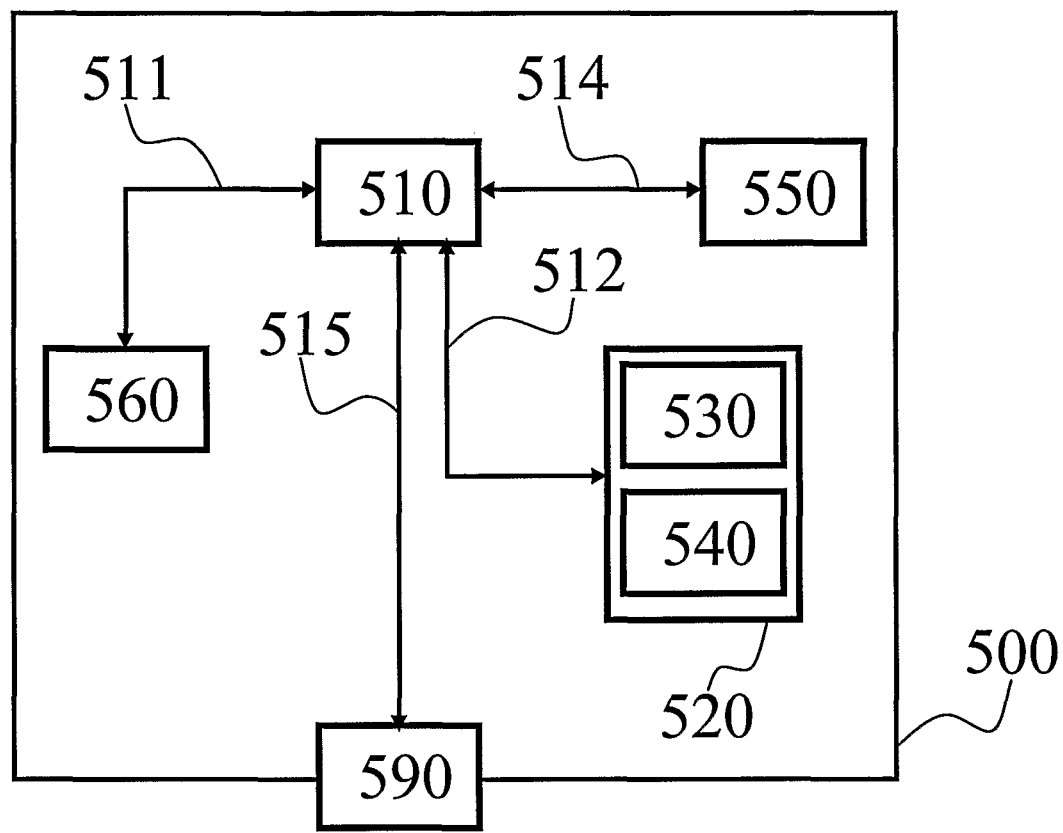
FIG. 4 shows diagrammatically a computer device that is used according to an embodiment of the invention.

FIG. 4 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the control unit 45. The data-processing unit 510 can comprise, for example, a microcomputer.

The memory 520 also has a second memory part 540, in which a program for controlling the clutch according to the invention is stored. In an alternative embodiment, the program for controlling the clutch is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims.

The invention claimed is:

1. A method for controlling a position of an automatic disc clutch, in which method the primary function of the disc clutch is to transmit motive force from an internal combustion engine arranged in a vehicle to an input shaft of a stagegeared gearbox arranged in the vehicle, the method comprising engaging a starting gear of the gearbox, positioning the clutch in a first position for preparing the vehicle for take off, the clutch transmitting torque in the first position, and positioning the clutch in a second more disengaged position compared to the first position if a driver of the vehicle does not demand vehicle take off torque by activating a throttle control within a predetermined time.

2. The method as claimed in claim 1, wherein if a brake pedal in the vehicle is depressed before the predetermined time has passed, then the clutch is positioned in the second position when sensing depression of the brake pedal.

3. The method as claimed in claim 1, wherein the predetermined time is more than 3 seconds long.

4. The method as claimed in claim 1, wherein the second position is a position where the clutch is considered fully disengaged.

5. A control unit for controlling a position of an automatic disc clutch in a vehicle, which disc clutch is arranged to transmit motive force from an internal combustion engine to an input shaft of a stagegeared gearbox in the vehicle, the control unit being arranged to position the clutch in a first position (PosRF), preparing the vehicle for take off, with the gearbox having a starting gear engaged, and where the clutch in the first position transmits a torque, the control unit being further arranged to position the clutch in a second more disengaged position compared to the first position if a driver of the vehicle does not demand vehicle take off torque by activating a throttle control within a predetermined time.

6. A computer programmed for executing the method as claimed in claim 1.

7. A computer program product stored on a non-transitory computer-readable medium for executing the method as claimed in claim 1.

8. A non-transitory computer program product directly loadable into an internal memory in a computer, which computer program product comprises a computer program for executing the method as claimed in claim 1, when the computer program on the computer program product is executed on the computer.

\* \* \* \* \*